E. H. JOHNSON.
AUTO BAGGAGE CARRIER.
APPLICATION FILED MAY 26, 1920.
1,388,044.
Patented Aug. 16, 1921.
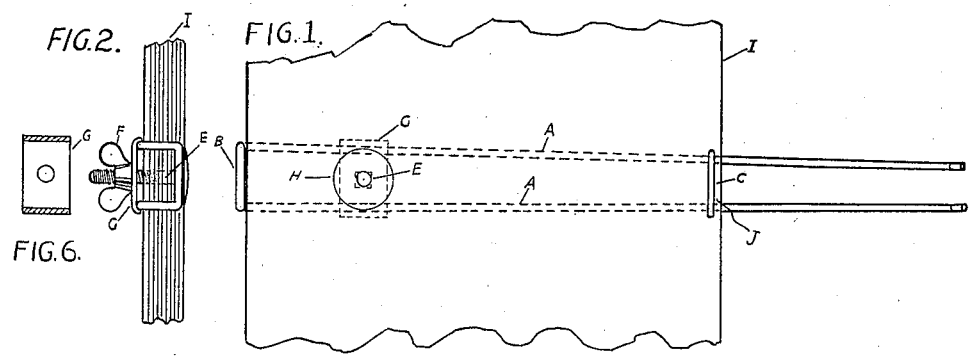
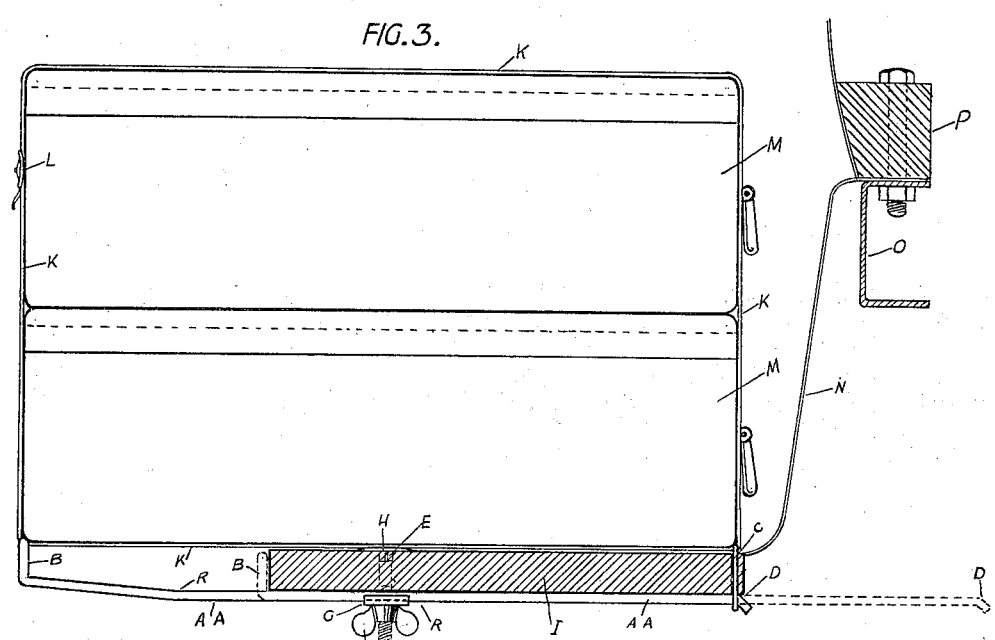
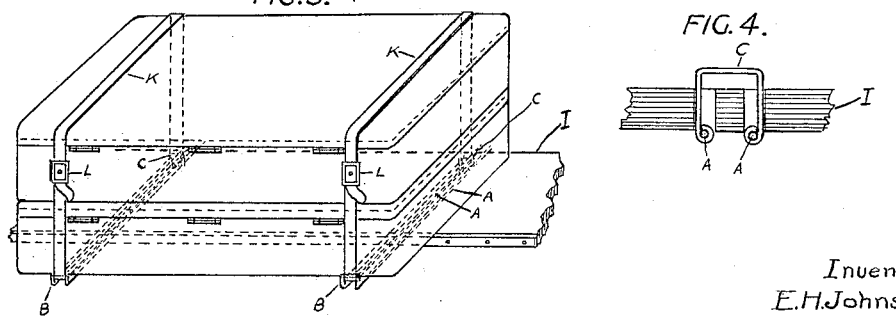
Inventor
E. H. Johnson.
Geo. P. Kimmel
Atty.

UNITED STATES PATENT OFFICE.

ENOS H. JOHNSON, OF LOS ANGELES, CALIFORNIA, ASSIGNOR OF ONE-HALF TO C. N. HOWARD, OF LOS ANGELES, CALIFORNIA.

AUTO BAGGAGE-CARRIER.

1,388,044.  Specification of Letters Patent.  Patented Aug. 16, 1921.

Application filed May 26, 1920. Serial No. 384,270.

*To all whom it may concern:*

Be it known that I, ENOS H. JOHNSON, a citizen of the United States, residing at Los Angeles, in the county of Los Angeles and State of California, have invented certain new and useful Improvements in Auto Baggage-Carriers, of which the following is a specification.

The invention relates to a luggage carrier, and more particularly to the class of holder attachments for automobiles or the like.

The primary object of the invention is the provision of an attachment of this character, wherein luggage, parcels or the like can be fastened in place upon the step or running board of an automobile for the carrying of said luggage, parcels or other like articles thereby.

Another object of the invention is the provision of an attachment of this character, wherein the mounting thereof upon the step or running board of the automobile permits convenient adjustment, so that when the attachment is not in use the same can be moved inwardly relative to the step or running board so as to be out of the way and when it is desired to carry luggage, parcels or other like articles the attachment can be pulled outwardly to the desired position and fastened, whereby said luggage, parcel or other article can be strapped securely upon the step or running board for the convenient carriage of said luggage, parcel or other article, without the possibility of the loss of the same during transit.

A further object of the invention is the provision of an attachment of this character, wherein the same can be readily adjusted to hold articles and parcels of different sizes, the adjustment being effected without the use of a wrench or other like tool and the construction and arrangement of the attachment permits the use of a strap, rope or other fastening medium for the securing of the article upon the step or running board of the automobile.

A further object of the invention is the provision of an attachment of this character, which in the construction and arrangement thereof can be carried at all times upon the running board or step of the automobile and when required for use in carrying articles can be easily and quickly adjusted, the attachment being extremely simple in construction, strong, durable and inexpensive to manufacture.

The invention consists in certain novel features of construction and combinations and arrangement of parts as will be more fully hereinafter described and pointed out in the claims.

Referring to the accompanying drawings:

Figure 1 is a fragmentary top plan view of the step or running board of an automobile showing the attachment constructed in accordance with the invention applied and in position when not in use.

Fig. 2 is a front edge elevation.

Fig. 3 is a vertical transverse sectional view through the step or running board of the automobile and adjunct parts of the chassis and body, showing the attachment by full lines in extended position with luggage fastened in place upon the step or running board and by dotted lines the normal position of the attachment when not in use.

Fig. 4 is a fragmentary rear elevation of the step or running board showing in detail the rear loop member of the attachment.

Fig. 5 is a fragmentary perspective view showing a piece of luggage strapped to the attachment.

Fig. 6 is a plan view in detail of the guide member of the fastener for the attachment.

Similar reference characters indicate corresponding parts throughout the several views in the drawings.

Referring to the drawing in detail, I designates generally a portion of the step or running board, N the fender or guard, O the side sill of the chassis and P the frame of the body of an automobile, these parts being of the usual well known construction and are merely illustrated to show the arrangement and mounting of the luggage carrier attachment hereinafter fully described.

The luggage holder attachment comprises a slidable member, preferably made from a single bar or rod bent into substantially U-form to provide spaced limbs or arms A and an outer upturned connecting portion forming an abutment B, while the inner free ends of said limbs or arms A are slightly downwardly bent to form stop extremities D, the slidable member in its unitary form being disposed transversely of the step or running board I at the desired location thereof beneath the same and is connected in place through the medium of a bolt E which is passed through a suitable hole in the step or running board I near the outer edge thereof, which bolt is disposed vertically and has its head H suitably fitted in the top face of the step or running board so as to prevent the turning of the bolt. Engaged upon the bolt E at the lower threaded end portion thereof is a winged adjusting nut F which is adapted to play against a cross guide plate G designed to straddle the limbs or arms A of the slidable member and to clamp the latter on tightening the nut F so that the said member can be held fast in adjusted position when pulled outwardly relative to the step or running board I or pushed inwardly with respect to the same.

Suitably mounted in the step or running board I contiguous to the rear edge thereof in the path of movement of the slidable member is an inverted substantially U-shaped bail or loop C which has formed at the free ends of the same suitable eyes for accommodating the limbs or arms A of the slidable member. The bail or loop C constitutes the rear guide for the slidable member and also acts as a strap receiver. The connecting end B of the slidable member also serves as a strap receiver, the strap K being adapted to be trained through the end B and bail or loop C, when applied to an article or piece of luggage M. The strap after it has been passed through the end B and bail or loop C is carried about the luggage M and fastened at its ends through the medium of a buckle L so that the luggage or article will be made fast upon the step I for the carrying of the same upon the latter as is clearly shown in Figs. 3 and 5 of the drawing.

It is of course understood that prior to the engagement of the strap K the slidable member is properly adjusted and fastened in its adjusted position by actuating the nut F which works against the guide plate G, the latter also serving as a clamping device for the slidable member, which on the adjustment thereof is pulled outwardly to the desired distance according to the size of the article or luggage to be strapped upon the step or running board I and thereafter the strap K is trained about the luggage or article M and through the end B of the slidable member and the loop or bail C and thereafter the ends of the strap are fastened together to firmly hold fast the article or luggage M upon the step or running board.

It is of course understood that in the use of the luggage holder attachment the parts thereof hereinbefore described are duplicated as is shown in detail in Fig. 5 of the drawing.

When the luggage holder attachment is not in use the slidable member is pushed inwardly to the position shown in Fig. 1 of the drawing so as to be out of the way and to overcome damage thereto.

The extremities D of the limbs or arms A of the slidable member limit the outward movement of the latter, when the same is pulled upon to bring it into position for use.

The construction of the attachment and the manner of mounting the same upon the step or running board I affords permanency in the assemblage and a part of the latter.

From the foregoing it is thought that the construction and manner of use of the attachment will be clearly understood and therfore a more extended explanation has been omitted.

What is claimed is:

1. A luggage holder attachment of the character described, comprising a slidable member having spaced arms, and a closed upturned outer end, means adapted to be mounted in the running board of an automobile for slidably and adjustably connecting the arms of said member beneath said running board, a guide bail adapted to be engaged in the running board near its inner edge and slidably receiving the spaced arms and preventing removal of the free ends of said member, and an article holding strap trained through the bail and closed end of the slidable member and adapted to embrace an article for the holding of the same upon the running board.

2. A luggage holder attachment of the character described, comprising a slidable member having spaced arms, and a closed upturned outer end, means adapted to be mounted in the running board of an automobile for slidably and adjustably connecting the arms of said member beneath said running board, a guide bail adapted to be engaged in the running board near its inner edge and slidably receiving the spaced arms and preventing removal of the free ends of said member, an article holding strap trained through the bail and closed end of the slidable member and adapted to embrace an article for the holding of the same upon the running board, and stop extremities on the arms of the slidable member engageable with the guide bail to limit the movement of said slidable member relative to the running board in one direction.

3. The combination with a slidable member having arms of a bail adapted to be mounted vertically in the running board of an automobile to extend above and below same, the lower portion of the bail having eyes to receive the arms of the slidable member for slidably supporting the same beneath the running board, and a strap turned through the outer end of the slidable member and the upper portion of the bail for the fastening of luggage upon said running board.

4. The combination with a slidable member having arms with stops at the extremities thereof, of a bail adapted to be mounted vertically in the inner side of the running board of an automobile to extend above and below same, the lower portion of the bail having eyes to receive the arms of the slidable member for slidably supporting the same and preventing removal of said arms, a strap turned through the outer end of the slidable member and the upper portion of the bail for the fastening of luggage upon said running board, and means to secure the arms of the slidable member in adjusted position relative to the running board.

In testimony whereof, I affix my signature hereto.

ENOS H. JOHNSON.